United States Patent
Silzer, Sr. et al.

(10) Patent No.: US 9,280,902 B2
(45) Date of Patent: *Mar. 8, 2016

(54) FACILITIES MANAGEMENT

(75) Inventors: Robert Silzer, Sr., Surrey (CA); Ariel Kurland, Maple Ridge (CA); Kirk Bratvold, Surrey (CA); Alex Doaga, Surrey (CA); Clinton Jordan Singer, Surrey (CA); Daniella Kurland, legal representative, Maple Ridge (CA)

(73) Assignee: DSG TAG Systems, Inc., Surrey (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,929

(22) Filed: Jan. 24, 2012

(65) Prior Publication Data

US 2013/0021174 A1     Jan. 24, 2013

Related U.S. Application Data

(63) Continuation-in-part of application No. 13/082,886, filed on Apr. 8, 2011.

(60) Provisional application No. 61/322,715, filed on Apr. 9, 2010.

(51) Int. Cl.
     *G05D 1/02*            (2006.01)
     *G08G 1/00*          (2006.01)

(52) U.S. Cl.
     CPC .............. *G08G 1/207* (2013.01); *G05D 1/0278* (2013.01); *G05D 1/0297* (2013.01); *G05D 2201/0204* (2013.01); *G05D 2201/0208* (2013.01)

(58) Field of Classification Search
None
See application file for complete search history.

(56) References Cited

U.S. PATENT DOCUMENTS

| | | | |
|---|---|---|---|
| 5,053,768 | A | 10/1991 | Dix, Jr. |
| 5,326,095 | A | 7/1994 | Dudley |
| 5,364,093 | A | 11/1994 | Huston |
| 5,524,081 | A | 6/1996 | Paul |
| 5,685,786 | A | 11/1997 | Dudley |
| 5,751,244 | A | 5/1998 | Huston et al. |
| 5,772,534 | A | 6/1998 | Dudley |
| 6,009,116 | A | 12/1999 | Bednarek et al. |
| 6,024,655 | A | 2/2000 | Coffee |
| 6,038,502 | A | 3/2000 | Sudo |
| 6,225,890 | B1 | 5/2001 | Murphy |

(Continued)

FOREIGN PATENT DOCUMENTS

| | | |
|---|---|---|
| JP | 2007293647 | 11/2007 |
| WO | WO 02095698 | 11/2002 |

OTHER PUBLICATIONS

Larsson et al.; T4—Telematics for Totally Transparent Transports; Intelligent Transportation Systems; 21 pages; Sep. 2005.

(Continued)

*Primary Examiner* — Thomas Tarcza
*Assistant Examiner* — Richard Goldman
(74) *Attorney, Agent, or Firm* — Thorpe North & Western, LLP

(57) ABSTRACT

A system for facilities management can include a tag device having a transceiver and a facilities management process. The facilities management process can include an application service for receiving the location of the tag device from the transceiver, at least one geographical work zone, and a tracking module configured for recording a time period the tag device is within each geographical work zone.

19 Claims, 6 Drawing Sheets

(56) References Cited

U.S. PATENT DOCUMENTS

| | | |
|---|---|---|
| 6,278,402 B1 | 8/2001 | Pippin |
| 6,339,745 B1 * | 1/2002 | Novik ............................ 701/431 |
| 6,348,007 B2 * | 2/2002 | Kawasaki et al. ............. 473/131 |
| 6,356,822 B1 * | 3/2002 | Diaz et al. .................... 701/29.3 |
| 6,496,141 B2 | 12/2002 | Pippin |
| 6,525,690 B2 | 2/2003 | Rudow et al. |
| 6,625,539 B1 * | 9/2003 | Kittell et al. ................. 701/29.3 |
| 6,988,034 B1 | 1/2006 | Marlatt et al. |
| 7,233,814 B2 | 6/2007 | Wissinger et al. |
| 7,239,965 B2 * | 7/2007 | Wehrlen et al. ................ 701/36 |
| 7,246,007 B2 | 7/2007 | Ferman |
| 7,271,701 B2 | 9/2007 | Kokubu et al. |
| 7,319,931 B2 | 1/2008 | Uyeki et al. |
| 7,457,693 B2 | 11/2008 | Olsen et al. |
| 7,489,993 B2 * | 2/2009 | Coffee et al. ................ 701/32.3 |
| 7,571,036 B2 | 8/2009 | Olsen et al. |
| 7,683,774 B2 | 3/2010 | Olsen et al. |
| 7,734,500 B1 | 6/2010 | Allen et al. |
| 7,751,975 B2 | 7/2010 | Allen et al. |
| 7,756,615 B2 | 7/2010 | Barfoot et al. |
| 7,768,426 B2 | 8/2010 | Groft |
| 7,808,371 B2 | 10/2010 | Blanchet et al. |
| 8,103,402 B2 | 1/2012 | Kozlay |
| 8,131,456 B2 | 3/2012 | Mahalingaiah et al. |
| 2002/0049523 A1 | 4/2002 | Diaz et al. |
| 2002/0156558 A1 | 10/2002 | Hanson et al. |
| 2003/0093199 A1 | 5/2003 | Mavreas |
| 2004/0049345 A1 * | 3/2004 | McDonough et al. .......... 702/12 |
| 2005/0068191 A1 | 3/2005 | Exchke et al. |
| 2005/0171660 A1 * | 8/2005 | Woolford et al. ................ 701/33 |
| 2005/0203683 A1 * | 9/2005 | Olsen et al. ..................... 701/35 |
| 2006/0052918 A1 * | 3/2006 | McLeod et al. ................. 701/29 |
| 2006/0111822 A1 | 5/2006 | Simon |
| 2006/0129309 A1 | 6/2006 | Alewine et al. |
| 2006/0229780 A1 | 10/2006 | Underdahl et al. |
| 2006/0265128 A1 * | 11/2006 | Miller ........................... 701/213 |
| 2007/0185627 A1 * | 8/2007 | Mavreas ........................... 701/2 |
| 2008/0167825 A1 * | 7/2008 | Tarabzouni et al. ............ 702/36 |
| 2009/0284348 A1 * | 11/2009 | Pfeffer ........................... 340/7.3 |
| 2010/0250312 A1 * | 9/2010 | Tarabzouni et al. .............. 705/7 |
| 2012/0089271 A1 | 4/2012 | Silzer, Sr. |
| 2013/0060721 A1 | 3/2013 | Pinkus et al. |
| 2013/0065628 A1 * | 3/2013 | Pfeffer ........................... 455/521 |

OTHER PUBLICATIONS

U.S. Appl. No. 13/082,886, filed Apr. 8, 2011; Robert Silzer Sr; office action dated Mar. 25, 2014.

* cited by examiner

FACILITIES MANAGEMENT

RELATED APPLICATIONS

This application is a continuation-in-part and claims the benefit of U.S. patent application Ser. No. 13/082,886, filed on Apr. 8, 2011, which is incorporated in its entirety herein by reference. U.S. patent application Ser. No. 13/082,886 claims the benefit of U.S. Provisional Patent Application No. 61/322,715, filed on Apr. 9, 2010, which is also incorporated in its entirety herein by reference.

BACKGROUND

Operation and maintenance of a golf course can involve a significant investment of capital and manpower. Maximizing the utility of a course calls for maintaining greens, fairways, putting ranges, driving ranges, and other playing areas in a particular condition, requiring attention to the condition of grasses and other greenery. In addition, the large size of typical courses calls for wide variety of maintenance vehicles and course personnel to manage the golf course facility.

The acquisition and maintenance of golf carts and other course vehicles presents a significant investment in itself. However, the use of these vehicles—particularly by patrons—can raise further concerns. Unregulated operation by novice or reckless drivers can present risks to the drivers themselves, as well as to the vehicles, other patrons, and the course landscape. These problems can be addressed by monitoring and managing access to and use of course vehicles. As golf course operations multiply in size and number of facilities, management of larger vehicular fleets can present continuing challenges to architecture and implementation of such systems.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Figure 1:
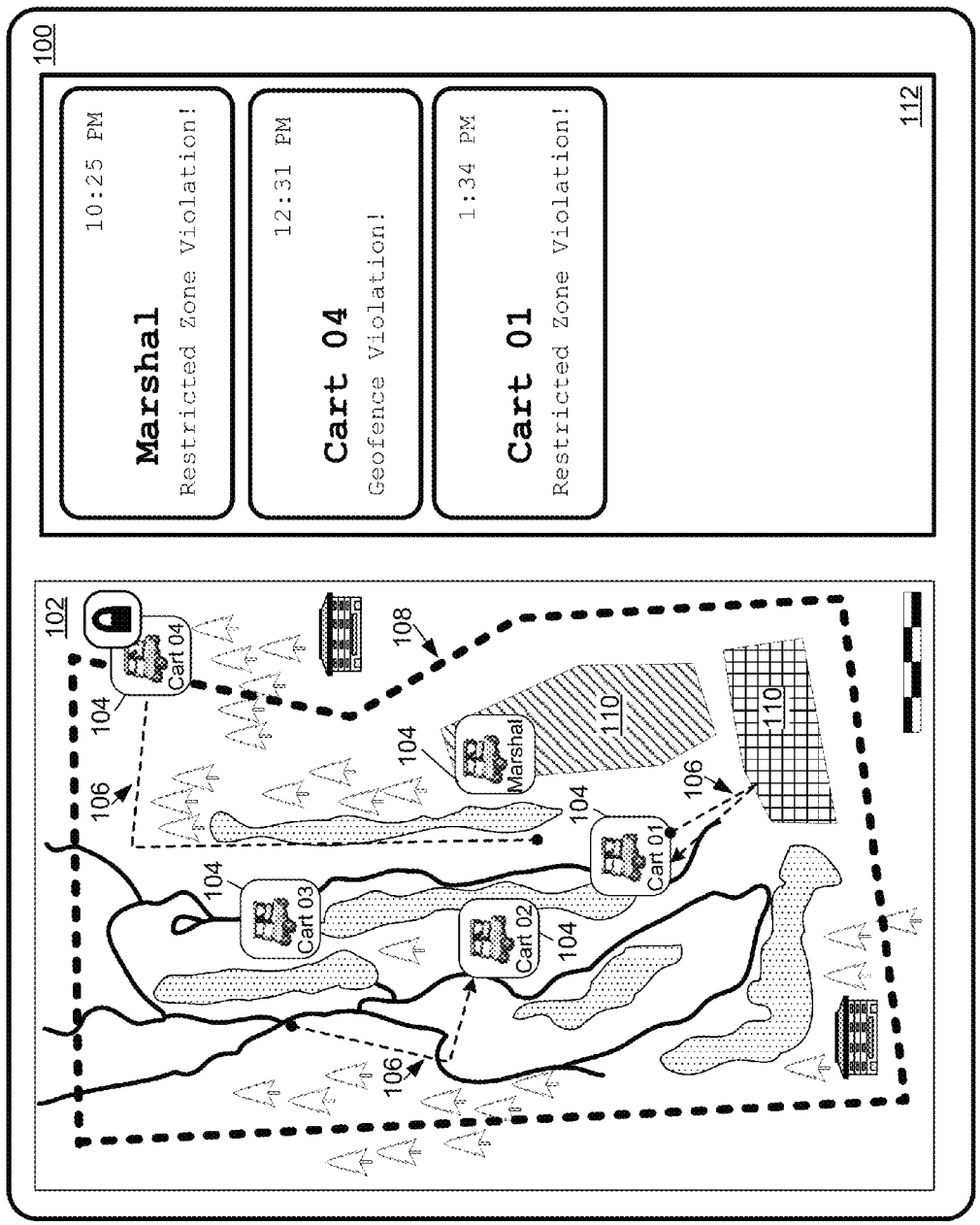
FIG. 1 depicts a snapshot of a graphic user interface for monitoring vehicles on a golf course in accordance with an embodiment.

Before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is to be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Methods and systems are set forth herein for managing mobile assets and tracking personnel with equipment within a geographic area for facilities management. Particular embodiments set forth methods and systems for monitoring and managing vehicular assets, based on information about location and movement of such assets within a geographic area. The vehicle assets (e.g., vehicles or facilities vehicles), as used herein, can include vehicles on wheels or equipment that can be carried by personnel, such as power equipment, like a hand-held trimmer. In an aspect, the information can be used to track the time the assets are within a specified geographical area, such as a work zone, or idle (non-work) periods outside the specified geographical area. The time period can be determined by recording an entry time and an entry date when the vehicle with a tag device used to determine the vehicle's location enters the geographical work zone and recording an exit time and an exit date when the vehicle exits the geographical work zone. When a vehicle enters a geographical home zone, the system can cease recording the time period for the geographical work zone or work activity. In another aspect, personnel can be associated with the vehicle assets for specified time period, such as a day or shift. In another aspect, personnel not associated with a vehicle (or piece of equipment) with a device tag can carry a tag device with similar or basic functionality as the device tag associated with the vehicle. The information generated by the device tag can be used to generate a facilities management value. For example, the information can be used to track labor costs or time worked by personnel, activity or work efficiency, fuel usage or power usage by equipment, average time or cost to maintain the geographical work zone, and/or last time the geographical work zone was maintained and the type of maintenance performed.

It should be understood that the embodiments discussed herein are contemplated for use with any type of mobile asset, and particularly any type of vehicle that can be made to move about in the area of interest, including automobiles and other conveyances both powered and unpowered, such as powered and unpowered vehicles, mobile maintenance or groundskeeping machines, and the like. For purposes of illustrating the various aspects of the methods and systems, the discussion below will be primarily directed to describing exemplary embodiments directed to monitoring and managing vehicles in and around a golf course. It should be noted, however, that the elements and principles discussed herein are applicable to management applications of facilities outside the field of golf course management. For example, references to "carts" and "vehicles" in the following discussion should be understood as generally applicable to vehicular assets that can be operated in and around golf courses such as golf carts, automobiles, riding mowers, scooters, motorcycles, all-terrain vehicles, snowmobiles, and the like. Similarly, reference to a "golf course" can generally also be applied to any geographic area within which monitoring and management of vehicular assets and work flows may be desirable. The methods and systems described can be used in any facility where work performed can be defined by time spent in distinct geographically areas, such as a golf course.

It is also noted that discussion of methods and systems herein can be interchangeable with respect to specific embodiments. In other words, specific discussion of a method herein is equally applicable to embodiments as they relate to the system, and vice versa.

A system for facilities management can comprise a plurality of vehicles, where one or more of the vehicles are equipped with a tag device. The tag device can include or be functionally connected to elements that collect and provide information about the location and movement of the vehicle. In a particular embodiment, the tag device can include or at least is functionally connected to a global positioning system (GPS) receiver, a motion sensor, or an inertial measurement unit (IMU). The IMU can be used to detect changes in motion, changes acceleration, or changes in orientation of the vehicle in a three dimensional (3D) coordinate system. In another embodiment, the tag device or other monitoring device can be coupled to the instrumentation panel or sensors of the vehicle to provide information about the vehicle, such as a battery usage, a battery voltage, a fuel level, a running engine indication, and similar types of status and diagnosis information that can be transmitted to a facilities management data system and/or stored in a server or database. The tag device can further include one or more elements having transceiver functionality so as to provide for communication of information to and from the vehicle. The transceiver can include a transmitter, receiver, and at least one antenna. Communication can be any type of communication network suited for transmitting data across the distances included in the area, particularly wireless LAN and mobile device networks, using standards such as the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In particular, the network can be configured so that each tag device can communicate with a server.

In an embodiment, the tag device can include an internal battery to supply its power needs. In a specific embodiment, the tag device is capable of drawing upon its internal battery and on an external power source such as a vehicle battery. In order to maximize the duty cycle of the internal battery while minimizing the impact on a vehicle battery, the system can assess when it is appropriate for the tag device to draw power from the vehicle battery. For example, it may be more suitable to draw on the vehicle battery when said battery is well charged, or is itself connected to an external power source, and less suitable in other situations (e.g. low charge, or during heavy use). In an aspect of the embodiment, the system can utilize various heuristics to determine when to draw upon the vehicle battery. Such heuristics can include but are not limited to time, motion, location, as well as vehicle battery voltage, and voltage trends.

In another example, the tag device or transceiver can be coupled to an input device and/or an output device on or near the vehicle where personnel associated with the vehicle can log information relative to geographical zone or location and/or a specified time. In another example, personnel associated with the vehicle can communicate with personnel at another location, such a central control station or another vehicle. The input device can include a mouse, keyboard, touch screen, microphone, camera, card reader, scanner, or similar device. The microphone can be used with a voice recognition application to convert verbal messages into text. The output device can include a display, touch screen, speaker, or similar device. The speaker can be used with a text conversion application to convert text into verbal messages. In an example, the output device can display the location of the vehicle on map. In another example, various locations on the map can be tagged with instructions and/or a prioritized list of scheduled work assignments.

In a particular embodiment, the various functionalities (e.g., GPS, motion sensing, receiving, transmitting) are integrated into the tag device to form a single package. However, embodiments in which one or more functionalities are provided by devices that are external to the tag device are also contemplated by the description herein.

In accordance with the present embodiment, communication between tag devices and a server facilitates the storage and handling of vehicle data for tracking, monitoring, and management of the vehicles by personnel, managers, or other user(s). Embodied on the server can be one or more modules, such as a tracking module, comprising computer-executable code configured for collecting, analyzing, manipulating and presenting data received from the tag devices and other vehicle monitoring systems. These modules can include databases, map data, user interfaces, communications server and/or client modules, and others embodied on the server as data structures and code. The computer-executable code can integrate with existing computer aided design (CAD) programs, aerial photographs, or map data, such as Google Earth, to generate specified geographical areas, such as geographical work zones and geographical home zones, where the map data is associated with a coordinate system, a map representation based on geographic information system (GIS) data, and/or GPS coordinates.

In a particular embodiment, data related to the geographical area can be embodied on the server. In one aspect, the geographical area data can include a coordinate system or a map representation based on GIS data. In an additional aspect, the area data can include designations of various types of zones within and around the course area or facility, and the square footage or acreage data of the area. The zones can be designated according to a crew or organizational division providing the maintenance or work, manager responsible for area, type of work, terrain, features and improvements, function, and the like. For example, a golf course can include, without limitation, pedestrian paths, cart paths, tee areas, fairways, greens, rough, fringe, bunkers, water hazards, and driving ranges, which require different types of management and maintenance. Each of these features can constitute different zones or be grouped into zones, sub-zones, or other category (e.g., work groups). In a particular aspect, code is embodied on the server by which zones can be added, deleted, and modified. In another example, the golf course or a facility can include a general category for the work zones, where the geographical area is to be maintained, and a general category for the home zones, where equipment is stored, maintained, or repaired. Vehicle time outside the work zone or the home zone may be categorized as a non-work time, non-productive time, or travel time.

The server can further hold one or more databases populated with information sent by tag devices and/or elements associated therewith. In a particular aspect, databases of location information, time information, personnel information, vehicle and equipment information, and consumables (e.g., materials and fuel) information can be stored on the server. For example, an onboard GPS receiver can periodically acquire the vehicle's GPS position from a satellite network, either arbitrarily or spontaneously, or at a determined sampling interval. In another configuration, the GPS receiver can periodically acquire the vehicle's GPS position when the vehicle is moving based on data from a motion sensor or IMU, and cease sampling GPS data when the vehicle is idling or relatively still. In an example, the tag device can send each position data point to the server for storage. A database can collect and hold a number of location points for each vehicle, together with the time at which the position was received. The system can provide real-time tracking of each vehicle. These location points can be used to construct a history of the vehicle's location over time (i.e. a location "trail"). The dimensions of the database can be based on the GPS sampling interval and the amount of accessible monitoring time desired. In another example, the database can periodically (e.g., daily) purge the database of sampled vehicle location points and retain information relative to the vehicle entering and exiting each geographical zone and other facility management data. In another configuration, the database can use a first-in first-out (FIFO) type queue in the database to cycle through stored sampled vehicle location points. In another configuration, the database may store the vehicle location point and time when the vehicle enters or exits each geographical zone. In a specific embodiment, the location information, the time information, the course map, and/or the geographical zones can then be viewed together to show where the vehicle's current and previous locations lie relative to the mapped area and any zones therein. The vehicle's current position can be represented by an icon on the mapped area. The icon may change appearance when the vehicle enters a zone or an alert is triggered. The icon may include a timer indicating the time the vehicle is within the zone, such as a work zone. The timer can include a cumulative time within the zone over a periodic time frame (e.g., a shift or day) or a time within zone each time the vehicle enters the zone. The display associated with server, such as at a central control station, and the display associated with the vehicle display can display different types of information. The information displayed may vary based on the status of the personnel viewing the data, where the information displayed to a manager may include more information and may vary from a worker. In a configuration, the user interface for the display associated with server and/or vehicle display can allow access to the facilities management system and/or the vehicle with a user name and password or a personnel identification card which can be read by a card reader associated with the server user interface or the vehicle user interface.

The facilities management system or server can be configured to run the facilities management process which can include an application service and a scheduling module. The application service can receive a location of the tag device from the transceiver. The scheduling module can include a calendar to periodically (e.g., hourly, daily, weekly, monthly, seasonally, or yearly) schedule work activities for specified vehicles, equipment, and/or personnel. The scheduling module can be used to forecast time, equipment, materials and supplies (e.g., fuel), and personnel for the work activities in the facilities management system. In an example, the scheduling module can compare periodic activity of the vehicle with prior periodic activity (such as an average time period for an activity or a prior time period for an activity) of the vehicle using information provided by the tracking module. The tracking of periodic activity can be used to monitor efficiency for various activities, vehicles, equipment, work zones, and/or personnel.

In another aspect, motion information and sensor data can also be stored on the server. The use of the motion sensor and/or IMU can reduce the sampling rate for the GPS receiver. For example, an onboard motion sensor can detect episodic or sustained motions undergone by the vehicle, and the tag device can transmit this information to the server. In a specific aspect, the motion information can include physical dimensions of the motion, e.g. the relative direction of motion and magnitude of velocity and/or acceleration. In another aspect, time-stamping can be utilized so that temporal information can be included, such as the time at which the motion commences and ceases and the duration of motion.

The server can further have a vehicle management process embodied thereon as machine executable code, where said process includes a tracking module configured for processing information received from tag devices to provide for management of vehicles, equipment, and other assets in and around the facility. In a particular embodiment, vehicles are equipped with a tag device and include a GPS device, a motion sensor (or IMU), and other vehicle sensors. The GPS receiver periodically determines the position of the vehicle, while the motion sensor monitors the presence or absence of motion by the vehicle. The other vehicle sensors can monitor other vehicle conditions, such as an engine running indicator, fuel level, or battery voltage. The tag device can send GPS location, motion data, and other sensor data to the server.

In an example, the server can further have a vehicle management process embodied thereon as machine executable code, where said process includes a tracking module configured for processing information received from tag devices to provide for management of golf carts and other assets in and around a golf course. In a particular embodiment, vehicles are equipped with a tag device and include both a GPS device and a motion sensor. The GPS receiver periodically determines the position of the vehicle, while the motion sensor monitors the presence or absence of motion by the vehicle. The tag device sends both GPS location and motion data to the server.

The tracking module can comprise a procedure that compares location data to course maps to and/or zones and ascertain the vehicle's location(s) or location trail on the course. In one aspect, the tracking module can include databases of information from tag devices and data structures representing designated zones. The procedure can further determine a vehicle's location relative to any designated zones associated with the course. In a particular aspect, the procedure can be configured to display location information with geographic zones via a graphic user interface, an example of which is shown in FIG. 1. The graphic user interface can operate on a computer situated to be accessible to golf course personnel, such as in a clubhouse, maintenance facility, or security facility.

In an additional aspect, map images may be included with zones in the map representation to facilitate recognition of terrain and features. The map image can be any type that shows desired features of the geographical area, including but not limited to satellite images, topographic maps, computer-aided drawings, hand drawings, aerial photographs, and the like.

A plurality of vehicles can also be viewed in the graphic user interface, and each vehicle can be given a label or other designation which can be signified by text, symbols, or icons. This aspect is illustrated in FIG. 1, which shows a graphic user interface 100 displaying a golf course map representation 102 in which the current locations of five vehicles 104 (golf carts 01 through 04 and a course marshal's cart) are shown along with their location trails 106. In one aspect, location trails can be coded (e.g. by color or pattern) to aid in distinguishing between the history of different individual vehicles.

Designated zones and other features can further be overlaid on the map. An example of this is shown in FIG. 1, which includes an outer course boundary designation 106 (bold dashed line) and two limited access zones 108 in the lower right corner. The user interface can be configured to be used for setting and adjusting attributes of particular vehicles and zones.

The graphic user interface 100 can further include an information display 112 that provides a user with information about vehicles, such as an alphanumeric representation of vehicle location, vehicle operational status, or alerts generated for vehicles.

A number of factors can influence the accuracy and precision of GPS measurements, thereby affecting their reliability in ascertaining vehicle location. For example, location information sent by a stationary GPS device can exhibit drift over time, i.e. sample-to-sample variation in location that are not due to any actual change in location. In accordance with an embodiment, the vehicle management system can utilize GPS data quality measurements to assess the reliability of location information. In a particular embodiment, the system can determine the number of satellites, horizontal dilution of precision, and estimated horizontal precision error for a set of coordinates. The reliability of coordinates is then based on whether the quality measurements meet specified criteria. In a particular aspect, the coordinates can be retained or discarded based on this validation process. In another aspect, the quality measurements are used to validate further events based on the coordinates, such as zone violations and alerts. For example, vehicle location coordinates may be collected that indicate that a vehicle is just within a particular zone, but the quality measurements indicate a certain probability that the actual location could be outside the zone. In such a case, the coordinates may be deemed insufficiently reliable to trigger an alert without additional validation.

In accordance with the embodiment, motion data can be used to validate the location data so as to provide more reliable trails and other location information. For example, a change in location occurring without a concurrent indication of motion can be viewed as possibly due to drift. The location change can then be treated accordingly by the tracking module. Possible actions with regard to such data can include deleting the information from the database, leaving the information in place but flagging it, and/or assigning a code or grade to the information to indicate a level of reliability. Similarly, motion-conditioned location information can be taken into account in process for constructing location trails. Trails can be constructed or edited to include only a limited number of questionable location points, or none at all. In another aspect, trails themselves can be graded to reflect the number or proportion of questionable location points they contain.

In one embodiment, more than one level of motion information can be utilized in tracking vehicles. In one aspect, a motion sensor on the vehicle can be configured to detect undifferentiated ("simple") motion, i.e. any type of movement undergone by the vehicle, such as occurring from driving, impact, tilting, rolling, etc. Such motion may or may not be associated with an actual change in location of the vehicle. However, simple motion may warrant heightened attention to the vehicle. Accordingly, detection of simple motion can be used to trigger more frequent collection of location information. In another aspect of the embodiment, a motion sensor can be configured to detect particular types of motion, such as motion that is indicative of operation that results in a change in location (e.g. an operator driving the cart). More specifically, the motion sensor can detect the direction of movement. An accelerometer is one nonlimiting example of such a sensor. This type of motion ("qualified motion") is more relevant to issues such as theft or otherwise unauthorized operation of the vehicle, and can be used to trigger appropriate alerts and/or control actions. In addition, the directional information in qualified motion can be used to validate a location trail. For example, a set of coordinates provided by the GPS receiver may indicate a false direction of motion (e.g. sideways). The qualified motion information can be used to validate or invalidate this location information, and in the latter case can trigger flagging or deletion of a false trail.

The location information, motion information, tracking process, and other elements discussed can facilitate not just monitoring of vehicles and other assets, but also direct or indirect management of such assets. In a particular example, a vehicle can be equipped with one or more vehicle controller devices that, when engaged, limit the responses of the vehicle to input from its driver. This can involve limiting vehicle speed, limiting or preventing either forward or backward motion, and turning off the vehicle's motor. An example of one such controller device is a relay that, when powered, disconnects the vehicle's ignition switch.

In a particular aspect, the vehicle controller device is configured to be engaged remotely, either directly or through the tag device. By combining this functionality with those described above in connection with the tracking functionality, it is possible to limit or prevent vehicle operation within designated physical or temporal zones. For example, the controller device can be engaged to render a vehicle inoperable when someone attempts to drive it into a prohibited location (e.g. a bunker) or to operate the vehicle after business hours.

In a particular embodiment, the monitoring process embodied on the server includes a control module. The control module can be configured to initiate a signal that engages a vehicle controller device on a vehicle. In a particular aspect, the control module can recognize an alert generated by certain activity, such as the vehicle entering a zone designated as off-limits to that vehicle or its driver. Such an alert can be generated through an interaction between the control module and the tracking process. For example, when the tracking module acquires a location for a vehicle that coincides with a map zone designated as off-limits (e.g. a parking lot), an alert can be generated or triggered by the tracking module or by the control module. This alert can in turn trigger one or more vehicle control actions, including causing the control module to remotely engage a vehicle controller device on the vehicle that acts to prevent operation of the vehicle that would cause further encroachment of the prohibited zone. An example of such an action can involve shutting off the vehicle's motor and disconnecting the ignition to prevent the operator from restarting the vehicle. Alternatively, the vehicle controller device can disengage the vehicle's forward drive so that the vehicle can only be backed out of the prohibited zone.

It is contemplated that effective management of vehicles can be accomplished using varying levels of vehicle control, where both physical control and virtual control of vehicles are employed in course management. This is particularly relevant where relays, solenoids, and other devices requiring power are used as controller devices for vehicles. Under such an approach, some alerts may call for sustained engagement of controller devices. One example is a situation in which a vehicle is driven onto the bank of a stream or other steep terrain, where there is a danger that further operation would result in damage to the vehicle or injury to the driver. Another example is when an operator drives a vehicle off a course grounds that is surrounded by high pedestrian traffic, creating an ongoing risk that the vehicle might be stolen. Alternatively, for activity that does not create an ongoing concern (e.g. slight or accidental movement of the vehicle), sustained engagement of vehicle controller devices may be unnecessary. In such cases, it can be more efficient to refrain from long-term engagement when a shorter engagement will suffice. Accordingly, in one aspect a vehicle control action can be performed for an amount of time that less than the duration of the triggering alert. More specifically, a control device (e.g. a trigger lock) can be engaged upon generation of an alert, but can then shut off or enter a standby mode before the alert ends. However, the control device can be re-engaged by the occurrence of a triggering event during the duration of the alert (e.g. vehicle motion or location change), and remain engaged for a certain time or until the alert is ended.

In an embodiment, the tag device can include an internal battery to supply its power needs. In a specific embodiment, the tag device is capable of drawing upon its internal battery and on an external power source such as a vehicle battery. In order to maximize the duty cycle of the internal battery while minimizing the impact on a vehicle battery, the system can assess when it is appropriate for the tag device to draw power from the vehicle battery. For example, it may be more suitable to draw on the vehicle battery when said battery is well charged, or is itself connected to an external power source, and less suitable in other situations (e.g. low charge, or during heavy use). In an aspect of the embodiment, the system can utilize various heuristics to determine when to draw upon the vehicle battery. Such heuristics can include but are not limited to time, motion, location, as well as vehicle battery voltage, and voltage trends.

In a particular aspect, the system can include a plurality of control schemes that in turn can each correspond to one of a plurality of alert levels. As discussed above, location information and motion information can be used to more effectively ascertain what is happening to each vehicle. This can in turn facilitate the assignment of alert levels, where each alert level is suited to the level of safety or security concern associated with particular types of occurrences. Each alert level can then elicit one or more actions deemed appropriate for the level of concern raised.

The number and types of alert levels, as well as the actions they elicit, can be preset in the processes embodied on the server, or alternatively, they can be set and adjusted by course personnel or other user. The actions can include an alert message provided to the user, an alert message provided to the vehicle operator, or both. In one aspect, the message may be a visual message such as provided via a graphical user interface, an email, a text message, and the like. For example, referring again to FIG. 1, visible alert messages can indicate violation of particular zones or features. As illustrated in FIG. 1, Cart 04 has crossed the outer course boundary ("Geofence"), while Cart 01 and Marshal have entered restricted zones 110. More specifically, at the time the display is generated, Marshal remains in a restricted zone, while Cart 01 has encroached a restricted zone at one point in its location history. Different colors, fonts, icons, and other indicia can be used to indicate different alert levels. In another aspect, auditory alerts can be used, such as a horn, siren, beep, or other sound signal, or a voice message delivered to a speaker, telephone, or radio.

Other actions can include vehicle control actions, such as activation of controller devices onboard the vehicle as described above so as to limit or "lock" the vehicle from further proscribed operation. This is illustrated in the user display shown in FIG. 1, where the icon for Cart 04 includes a padlock symbol to indicate that its operation is restricted due to a zone violation (here, entering an automobile parking lot).

One example of a hierarchy of alerts and actions in accordance with this embodiment can be based on the type of movement undergone by the vehicle as ascertained from location information and motion information. A purely exemplary set of alerts governing controller activation is shown in Table 1, though it should be appreciated that other actions such as alert messages could be governed by the same alerts or a different set.

TABLE 1

Hierarchy of Alert Levels for Control Actions Based on Motion Type

| Type of Motion Detected | Alert Level | Action |
|---|---|---|
| Brief and isolated, likely accidental (e.g. due to a gust of wind or slight impact to vehicle) | 0 | none |
| Brief and frequent | 1 | Lock vehicle after x instances of motion |
| Sustained, first instance | 2 | Lock vehicle, then auto release after y minutes |
| Sustained, second instance | 3 | Lock until manually released by authorized personnel |

In another aspect, alerts can be graded based on the location of the vehicle relative to designated zones, as exemplified in Table 2 for use of vehicle controller devices combined with alert messages:

TABLE 2

Hierarchy of Alert Levels for Actions and Notifications Based on Location

| Location | Alert Level | Action |
|---|---|---|
| Within "full access" zone | 0 | none |
| Approaching "limited access" zone or course outer boundary | 1 | Alert message to course personnel |
| Approaching course hazard | 2 | Warning message to vehicle operator |
| Entering "limited access" zone or course hazard; crossing course boundary | 3 | Lock vehicle |

In another aspect, alerts and corresponding actions can be conditioned on the time of day at which the activity occurs. For example, one set of alerts can be used for managing vehicles during business hours, while a different set is used for after-hours management. Taking the example further, after-hours alerts can be set to trigger more prohibitive actions and for longer durations than are used during business hours.

Figure 2:
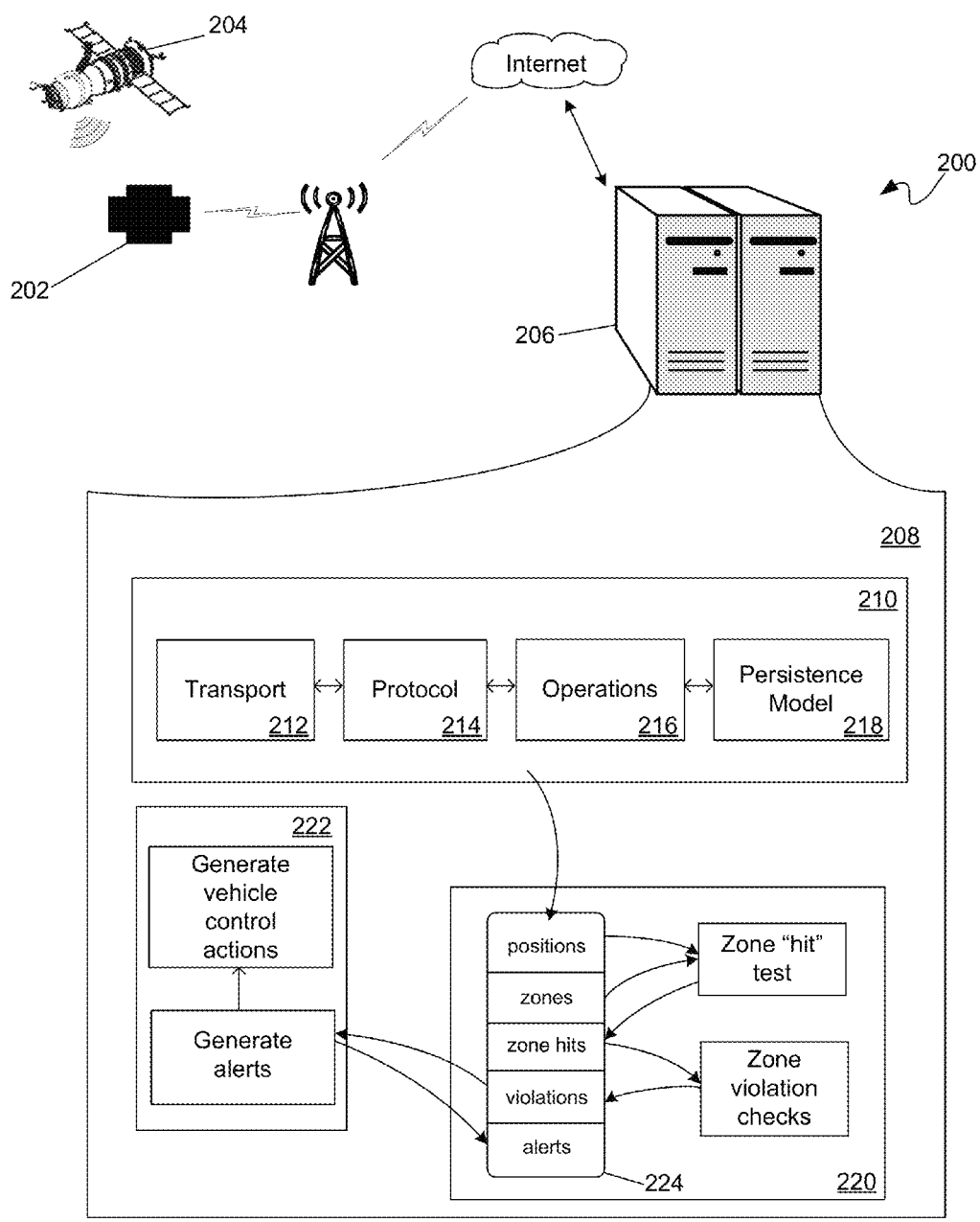
FIG. 2 depicts a chart of a vehicle management system in accordance with an embodiment.

An example of a system 200 for monitoring and managing vehicles in accordance with the present invention is illustrated in FIG. 2. An on-board tag device 202 receives location information from a GPS satellite network 204 and detects vehicle motion, and transmits this information via cellular network and internet to a computer system such as a server 206. Such a system can comprise machine readable code for a vehicle management process 208 embodied on the server, wherein the vehicle management process comprises an application service 210 configured for receiving information from on-vehicle tag devices, and includes subprocesses 212-216 directed to data transport, protocol, system operations, as well as a model 218 to provide object persistence. These elements are shown here to illustrate the nature of such a service, but are not exhaustive of elements that can be included in accordance with the level of knowledge in the art.

The process 208 further includes a tracking module 220 and a control module 222. The tracking module is configured to insert location information into a database 224. For example, the location information can be used to provide a series of vehicle positions. In one aspect, motion-related information can be used to condition or verify location information to yield the series of positions. The database can also include map-related information such as the zones designated in the area to be managed. Vehicle positions are compared to one or more zones to test for "hits", i.e. coincidences of vehicle location with zone coordinates. Hits are then checked against the settings for the zones to determine whether the hit is a violation of zone restrictions.

The tracking module 220 then causes the control module 222 to generate one or more alerts and control actions based on these analyses. The control module is configured to generate actions that can be used to manage operation of the vehicles on the course, including delivery of alert messages and activation of on-vehicle controller devices that limit or prevent certain vehicle operations. In a particular aspect, the control module is configured to generate different actions in response to an alert level.

The functionalities of the system, particularly tracking vehicle movement relative to designated zones, ascertaining the level of concern raised by particular movements and locations, and assigning a management action deemed appropriate to that activity, each reside primarily on the control server and particularly in the vehicle management process. One feature of this arrangement is that the system does not require particular proprietary on-vehicle devices. That is, it is possible to implement the system using "dumb" on-vehicle devices (motion sensors, GPS devices, transmitters, etc.) Such devices are readily obtainable from many market sources, so that vehicles can be equipped with whatever device is most available or most inexpensive as needed. Furthermore, the system can be implemented using an assortment of models of each device type, as long as the model is suitable for its basic function. Therefore, more vehicles and more devices can be added to the system without being concerned with exactly matching the models already in use. As a consequence, the system is highly scalable.

Another feature can be that the system is readily customized to a particular course and the needs or preferences of course managers. That is, zone configuration, zone properties, alert levels, control actions and other attributes can be set and modified at the server level. As such, modifications to the system need not require modifying the on-board devices of each vehicle. This facilitates changing the system to reflect new course policies or even new terrain in the event that the course is reconfigured. In addition, the system is portable, i.e. the process and vehicles can be transferred to another course and implemented at that course by updating the course map.

In another particular embodiment, some functionalities of the server-based process can also be provided in the on-vehicle devices, so that those functionalities can remain operational in the event that network communication is disrupted.

As the number of vehicles to be managed increases, synchronous real-time processing of all incoming tag position data can increase processing power requirements. In some cases, this requirement may become expensive or even prohibitive. In an embodiment, the vehicle management process is configured to monitor vehicles asynchronously in such a way as to yield substantially real-time results. In a specific embodiment, the general steps of position detection, checking for hits and violations, generating alerts, and causing control actions as discussed above are not all repeated at each instance of location acquisition. That is, once a new position is added to the database, the system need not immediately perform zone hit tests. Instead, zone hit testing and violation checks may be run at particular intervals (e.g. every few seconds), and operate on batches of positions rather than individual positions. Likewise, alert generation and control actions can be similarly decoupled, where alerts generated within a set interval are processed as a batch. The intervals, batch size limits, and other parameters can be adjusted manually or automatically to suit different levels of concern based on considerations such as danger associated with a type of violation, time of day/night, operator class, and the like.

In another aspect, further scalability is provided through multiplication and offloading of process components. That is, any of zone hit testing, violation checks, alert generation, and vehicle controller activation can be offloaded to servers other than the server receiving tag information. Therefore, large-scale management architectures can be accommodated without requiring prohibitive increases in computing power. For example, a large golf complex or even multiple courses can be monitored and managed using a server cluster.

Figure 3:
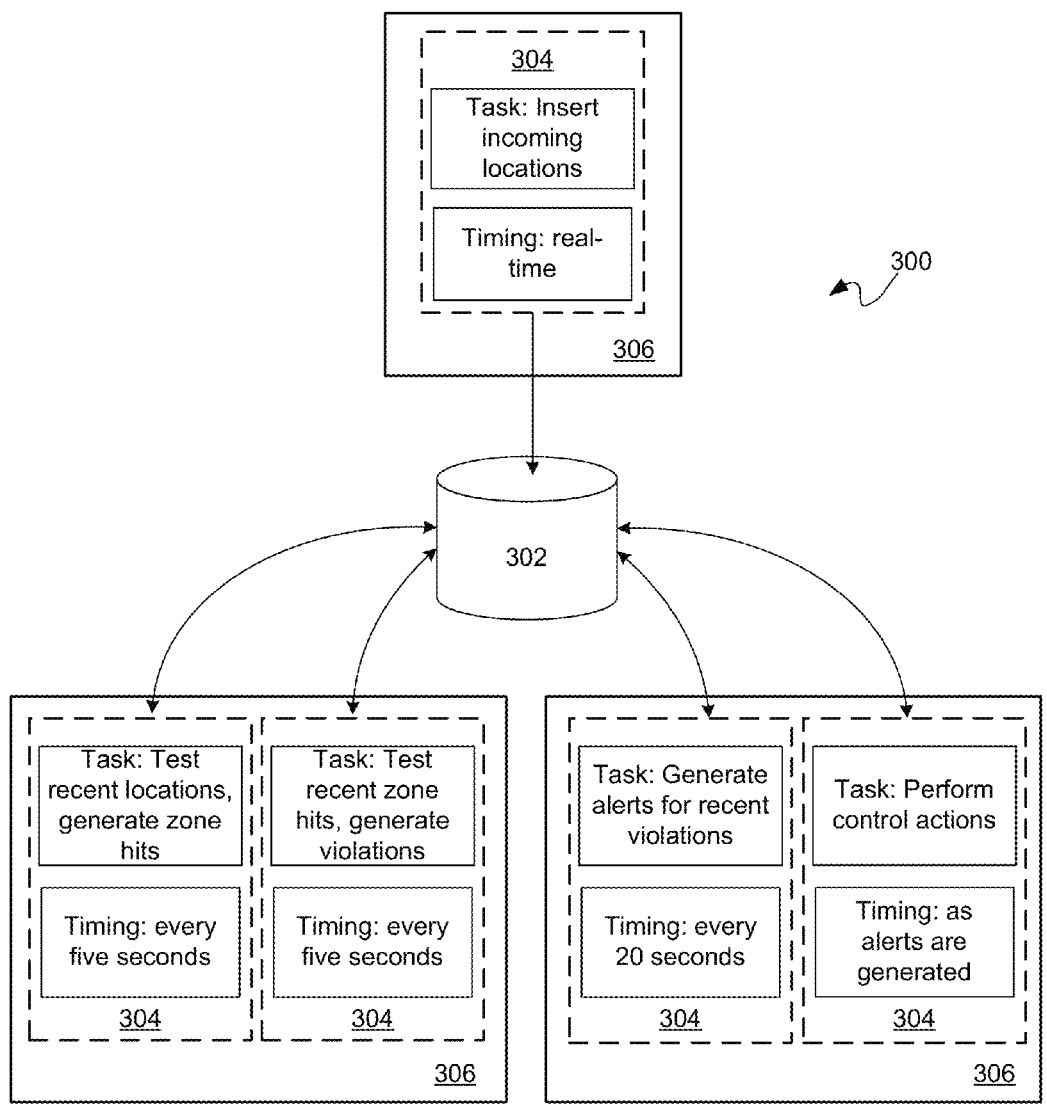
FIG. 3 depicts a chart of a vehicle management process in accordance with another embodiment.

An example embodiment of a process 300 illustrating these principles is shown in the chart of FIG. 3, where the dotted borders signify separate process components. For example, tasks for populating the database, tasks for zone testing of the database 302 and tasks for alert generation and vehicle controller activation can be allocated and replicated among separate process components 304. These components are isolated from each other and only share the database information in common. As such, each of the components or combinations thereof can be handled on separate machines 306 in a network or at separate locations, and further can each be replicated as indicated by the scale of the system.

Figure 4:
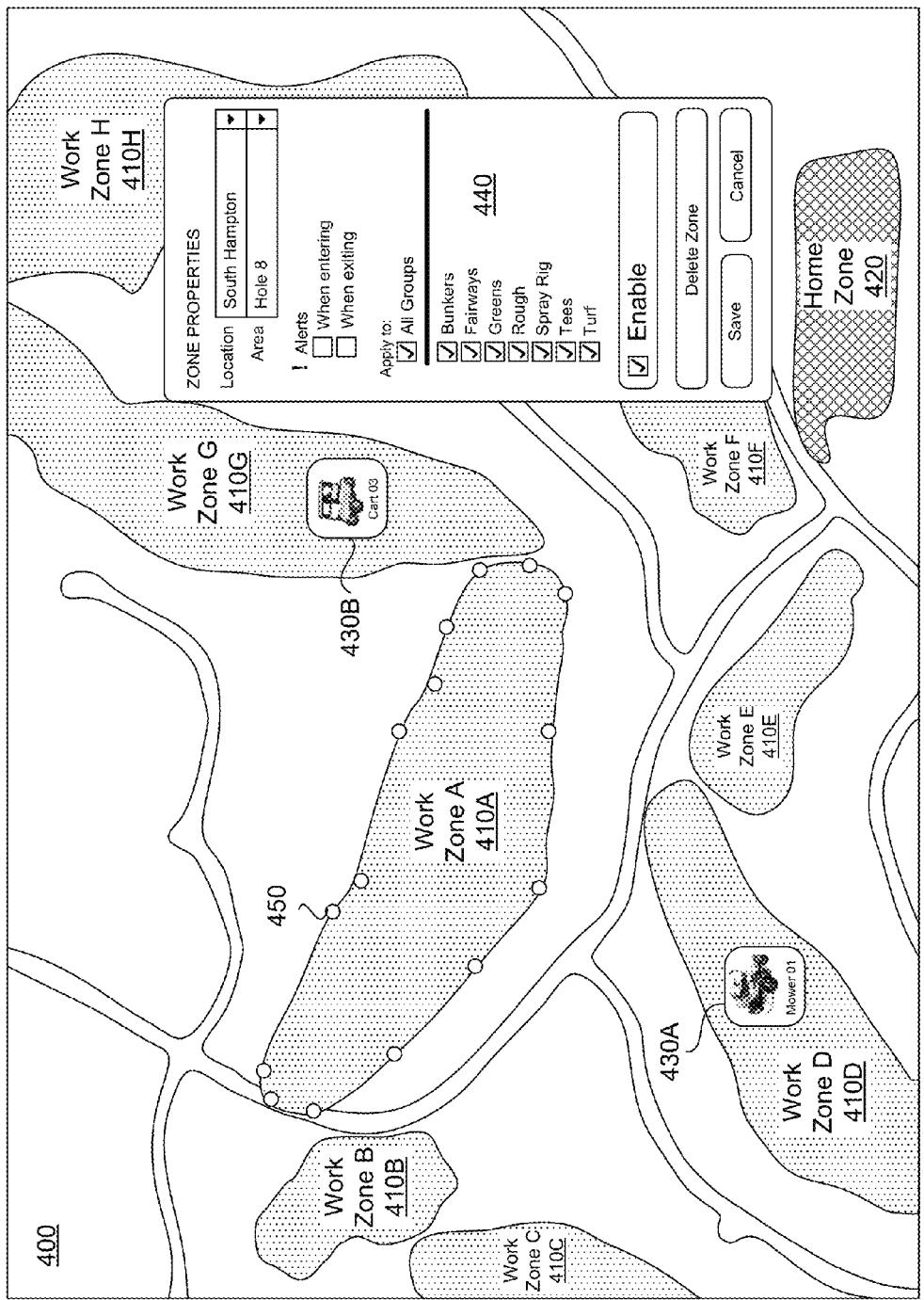
FIG. 4 depicts a snapshot view of a graphic user interface for tracking vehicles on a facility in accordance with an embodiment.

In another example, the tracking module can comprise a procedure that compares location data to course maps to and/or zones and ascertain the vehicle's location(s) or location trail in the facility. The location trail or the pattern of vehicle's motion can be used to generate efficiency models. For example, the fairways of a golf course can be mowed in a variety of patterns. Some patterns or configurations may use less time and fuel than other patterns, which can be tracked and monitored using the tracking module. In one aspect, the tracking module can include databases of information from tag devices and data structures representing designated zones. The procedure can further determine a vehicle's location relative to any designated zones associated with the facility. In a particular aspect, the procedure can be configured to designate geographic zones, such as work zones 410A-H and a home zone 420, and display location information for vehicles 430A-B within geographic zones via a graphic user interface 400, an example of which is shown in FIG. 4. The graphic user interface can operate on a computer situated to be accessible to personnel, such as in a central control station, clubhouse, maintenance facility, or security facility.

As illustrated in FIG. 4, each zone can be setup with markers 450 to delineate the boundaries of the zones. A dialog box, such as a zone properties dialog box 440, may be used to setup the properties of the zone or other features of the system like vehicle properties. The dialog box can include a location and area and can set an alert when vehicles enter or exit the zone. The zone properties can apply to different management activities or features of the facility, like fairways or greens. The zone properties can track specified types of vehicles, equipment, personnel, or patrons in the zone. In another example, the zone properties can provide different priorities for alerts for vehicles entering and exiting a zone, such as a home zone. The alerts can include an alarm or pop-up window in the graphical user interface or an email or text that can be sent to security or a manager, which could apply to vehicle activity after work hours.

In an additional aspect, map images may be included with zones in the map representation to facilitate recognition of terrain and features. The map image can be any type that shows desired features of the geographical area, including but not limited to satellite images, topographic maps, computer-aided drawings, hand drawings, aerial photographs, and the like.

A plurality of vehicles, such a mower 430A or a cart 430B, can also be viewed in the graphic user interface, and each vehicle can be given a label or other designation which can be signified by text, symbols, or icons. In one aspect, zones and vehicle icons can be coded (e.g. by color or pattern) to aid in distinguishing between different type of zones and vehicles. The vehicle icon, zone, type of vehicle can be selected to provide additional information on the vehicles. The graphic user interface 400 or a report can further include an information display that provides a user with information about the vehicle, such as a vehicle's label, a vehicle type or category, a vehicle's work group or operator, a vehicle's start time and/or end time in a particular zone or each zone, a vehicle's distance traveled in the zone, a vehicles moving time and/or idle time, a vehicle's fuel or battery level. Designated zones and other features can further be overlaid on the map. The user interface can be configured to be used for setting and adjusting attributes of particular vehicles and zones.

In another example, the server can generate reports to track and monitor the activity and costs of to manage a facility. For example, an area work activity report can include the time spent maintaining a facility by each vehicle group or vehicle type (e.g., greens, fairways, or roughs) over a selected period to time (e.g., a week or month), the time spent outside work zone (e.g., travel time between work zones, but excluding time in home zones), time spent working each area by each work group, and/or an average time for maintaining an area. A report can further extract activity information based the work zone, work group, feature, vehicle used, or personnel performing the activity. For example, on a golf course, a work group can include a bunkers, fairways, greens, spray rig, tees, and turf. Each hole can be defined by a work zone and can include various work groups. The activities of the various work groups in a work zone can be summed together to calculate the total time to management or maintain a work zone.

Reports can also be generated to show a work history, for various tracked and monitored areas and activities. For example, the work history report can provide a table showing the work zones and the work groups. Information in the table can include the last date and/or time activity was performed for a work group in a work zone and the time to perform the activity. The work history report can be used to schedule future activities for a work group in a work zone. The scheduling module may be used to determine a frequency of an activity and the tracking module with the scheduling module can assign and prioritize activities based on the prior activities for a work group in a work zone. Reports can be generated to show vehicle information, which can be used to evaluate vehicles and equipment and the effectiveness of various types of vehicles and equipment and to schedule maintenance for the vehicles and equipment. In one configuration, a vehicle can be assigned to a work group, so activity performed within a work zone by the assigned vehicle can be categorized with the work group.

In an example, alerts can be used to provide real-time monitoring of work activity and facilities management. Alerts can be used to identify inefficiencies or activities requiring attention, such as prolonged idle time. Alerts can be organized in a hierarchy of alerts and actions, which can be based on various factors such as when the tag device enters or exits the work zone, a location, a priority, a work crew, a distance traveled in the geographical work zone, moving time, idle time, a time of day, and a facilities management category. The facilities management category can be any information that is monitored by the system. Alerts can be customized based on a specific activity or condition. In another aspect, alerts and corresponding actions can be conditioned on the time of day at which the activity occurs. For example, one set of alerts can be used for managing vehicles during work hours, while a different set is used for after-hours management. Taking the example further, after-work hours alerts can be set to trigger more prohibitive actions and for longer durations than are used during work hours.

Figure 5:
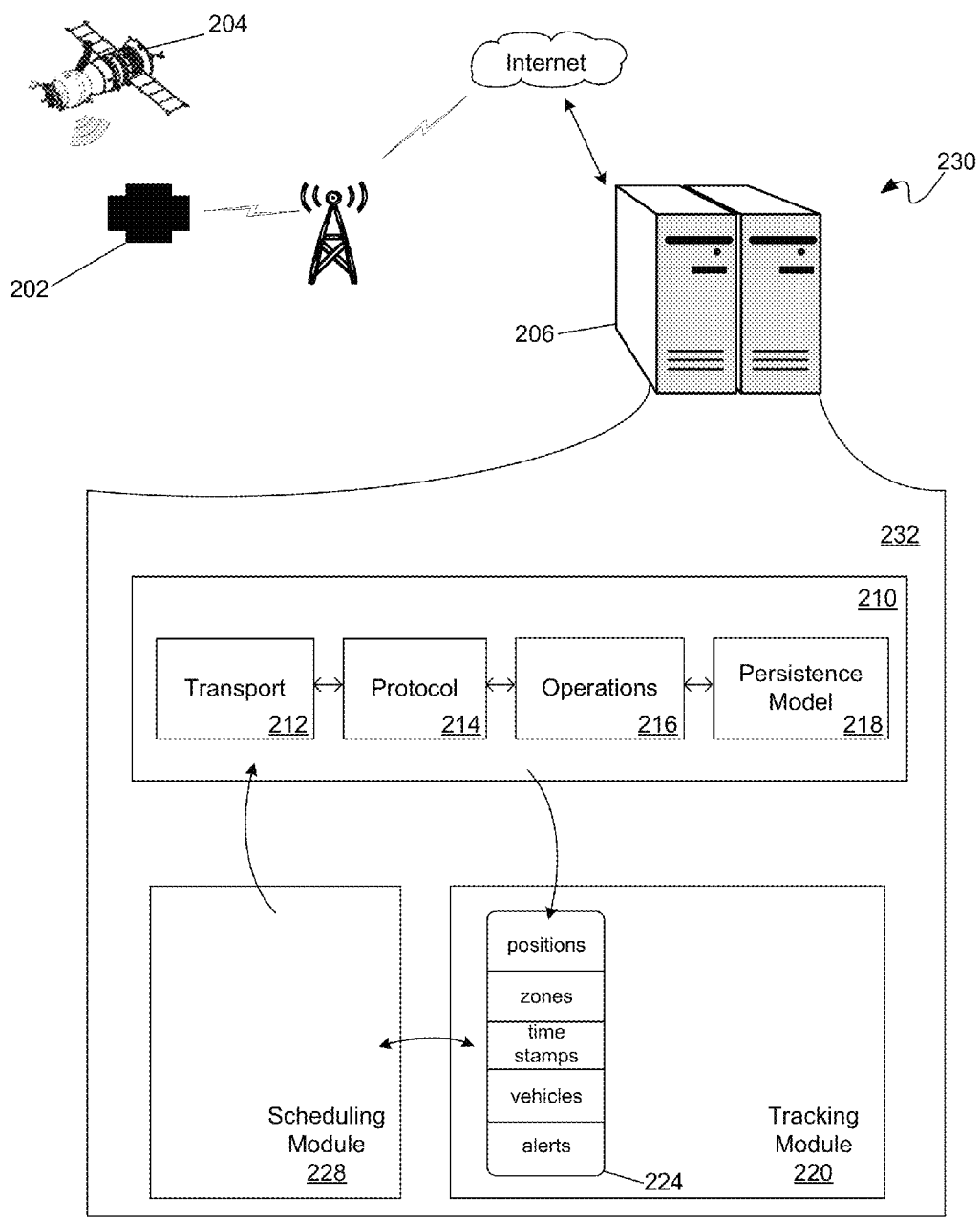
FIG. 5 depicts a diagram of a facilities management system in accordance with an embodiment.

An example of a system 230 for monitoring vehicles and managing facilities in accordance with the present invention is illustrated in FIG. 5. An on-board tag device 202 receives location information from a GPS satellite network 204 and detects vehicle motion, and transmits this information via cellular network and internet to a computer system such as a server 206. Such a system can comprise machine readable code for a vehicle management process 232 embodied on the server, wherein the vehicle management process comprises an application service 210 configured for receiving information from on-vehicle tag devices, and includes subprocesses 212-216 directed to data transport, protocol, system operations, as well as a model 218 to provide object persistence. These elements are shown here to illustrate the nature of such a service, but are not exhaustive of elements that can be included in accordance with the level of knowledge in the art.

The process 232 further includes a tracking module 220 and scheduling module 228. The tracking module is configured to insert location information into a database 224. For example, the location information can be used to provide a series of vehicle positions. The database can also include map-related information such as the zones designated in the area to be managed. The database can include vehicle information, time stamp information, and alert information.

The tracking module 220 module can communicate with the scheduling module 228 to schedule activity for the vehicles. The scheduling module may prioritize activities for the vehicles based on prior activity determined from information collected by the tracking module. In an example, instructions for the scheduled activity may be transmitted back to the vehicle.

The functionalities of the system, particularly tracking vehicle movement relative to designated zones, can reside on the control server and particularly in the vehicle management process. One feature of this arrangement is that the system may not require particular proprietary on-vehicle devices. That is, it is possible to implement the system using "dumb" on-vehicle devices (motion sensors, GPS devices, transmitters, etc.) Such devices are readily obtainable from many market sources, so that vehicles can be equipped with whatever device is most available or most inexpensive as needed. Furthermore, the system can be implemented using an assortment of models of each device type, as long as the model is suitable for its basic function. Therefore, more vehicles and more devices can be added to the system without being concerned with exactly matching the models already in use. As a consequence, the system is highly scalable.

Another feature can be that the system is readily customized to a particular facility and the needs or preferences of the facility managers. That is, zone configuration, zone properties, alert levels, and other attributes can be set and modified at the server level. As such, modifications to the system need not require modifying the on-board devices of each vehicle. This facilitates changing the system to reflect changes in labor cost, fuel costs, vehicle costs, work flows, and/or efficiency models.

In another particular embodiment, some functionalities of the server-based process can also be provided in the on-vehicle devices, so that those functionalities can remain operational in the event that network communication is disrupted.

Figure 6:
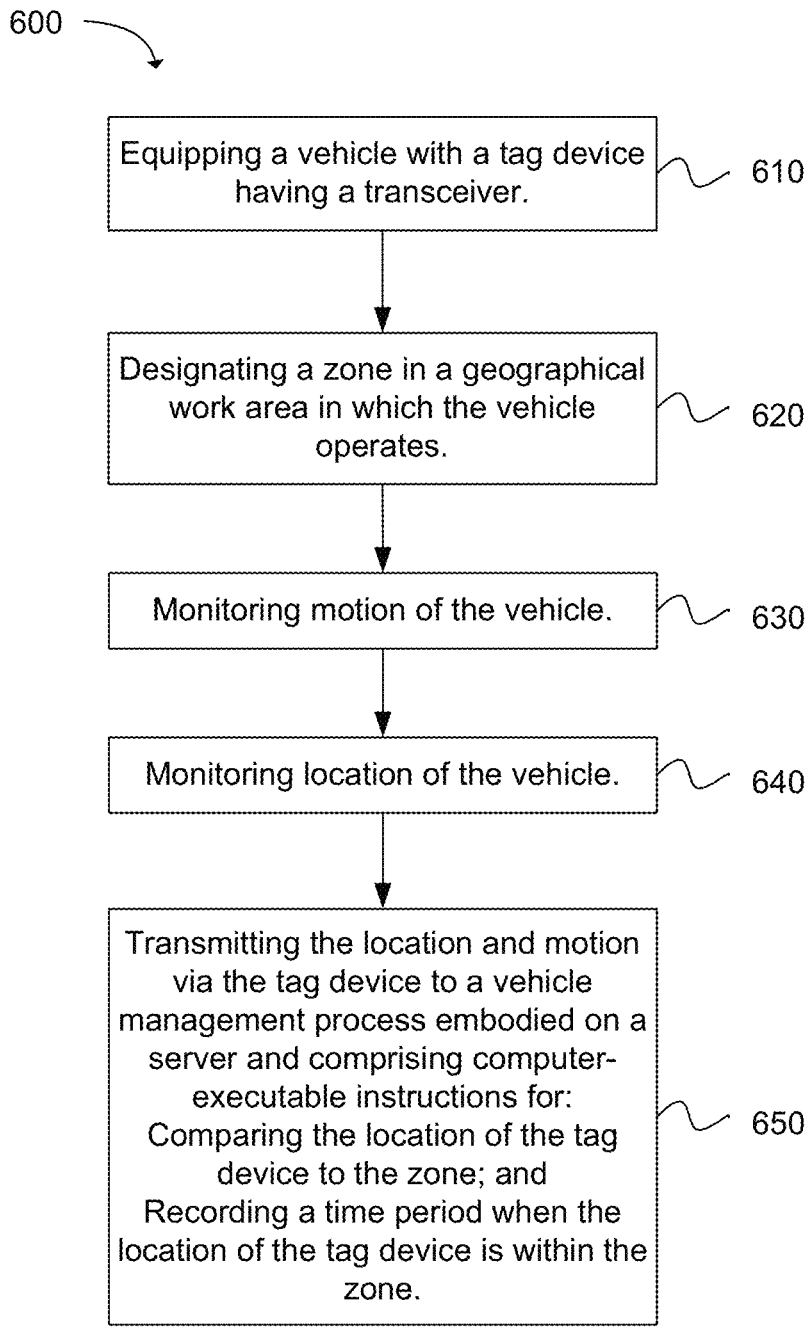
FIG. 6 depicts a flow chart of a method for managing facilities in accordance with an embodiment.

Another example provides a method 600 for managing facilities, as shown in the flow chart in FIG. 6. The method includes the operation of equipping a vehicle with a tag device having a transceiver, as in block 610. The operation of designating a zone in a geographical work area in which the vehicle operates follows, as in block 620. The next operation of the method can be monitoring motion of the vehicle, as in block 630. The operation of monitoring location of the vehicle follows, as in block 640. The method can further include transmitting the location and motion via the tag device to a vehicle management process embodied on a server and comprising computer-executable instructions for: comparing the location of the tag device to the zone; and recording a time period when the location of the tag device is within the zone, as in block 650.

All or parts of the management system can be upgraded or downgraded to a desired version. Version changes can be made to firmware components embodied on the devices of the system, such as the tag devices or vehicle control devices. In a particular aspect, a different version can be provided by transmitting the version information to the component to be upgraded or downgraded. The transmission costs imposed on the communication network by firmware delivery can be reduced by employing a content-agnostic approach. In one such approach, a binary difference between two versions of firmware can be ascertained, and this difference can be embodied in a firmware patch. The patch can then be delivered in either compressed or uncompressed form and integrated into the existing firmware, thereby accomplishing the change from one version to another. Also, other information such as updated zone information or device configuration can be transmitted to the devices as part of routine system operation. In a particular aspect, such transmissions are executed automatically, while version upgrades or downgrades can be manually initiated.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for facilities management, comprising:
    a tag device having a transceiver;
    a facility vehicle with the tag device attached to the facility vehicle;
    a facilities management process embodied on a computer-readable tangible medium, comprising:
        an application service for receiving a location of the tag device from the transceiver and determining movement of the tag device;
        at least two geographic work zones, wherein each geographic work zone comprises a geographic area maintained within a golf course facility and designates a crew or an organizational division providing maintenance or work, a manager responsible for an area, a type of work, and terrain;
        a tracking module configured for recording a time period the tag device is within each geographic work zone; and
        an efficiency module configured to compare the time period the tag device is within a geographic work zone to the pattern of movement within the geographic work zone.

2. The system of claim 1, wherein the facilities management process further comprises:
    at least one geographic home zone, wherein each geographic home zone represents an area where equipment is stored, maintained, or repaired,
    wherein the tracking module ceases recording the time period for the geographic work zones when the tag device is within the at least one geographic home zone.

3. The system of claim 2, wherein the tracking module records a non-work time period when the tag device is outside geographic work zones and the geographic home zone.

4. The system of claim 1, further comprising a global positioning system (GPS) receiver functionally connected to the tag device and configured for providing the location of the tag device.

5. The system of claim 1, further comprising an inertial measurement unit (IMU) functionally connected to the tag device and configured for detecting motion of the tag device.

6. The system of claim 1, further comprising:
    a battery sensor functionally connected to the tag device and configured for monitoring at least one of a battery usage and battery voltage of a battery for the facility vehicle; or
    an engine sensor functionally connected to the tag device and configured for determining when an engine of the facility vehicle is running.

7. The system of claim 1, wherein recording the time period includes recording an entry time and an entry date when the tag device enters at least one geographic work zone and recording an exit time and an exit date when the tag device exits at least one geographic work zone, and wherein the tracking module records a distance within the geographic work zone.

8. The system of claim 7, wherein the tracking module calculates a facilities management value selected from the group consisting of labor costs, fuel usage, power usage, average time in the geographic work zone, last time the geographic work zone was maintained, and at least one of the time period, the entry time, the entry date, the exit time, and the exit date for each geographic work zone, wherein the facilities management value is used to monitor efficiency.

9. The system of claim 1, further including a graphic user interface displaying a map representation, the at least two geographic work zones, the at least one geographic home zone, and the location of the tag device.

10. The system of claim 1, wherein the facilities management process further comprises a scheduling module that schedules the facility vehicle or comparing periodic activity of the facility vehicle with prior periodic activity of the facility vehicle using information provided by the tracking module.

11. The system of claim 1, wherein the facilities management process includes an alert in an alert hierarchy when the tag device enters or exits the at least one geographic work zone, wherein the alert hierarchy arranges alerts based on at least one of a location, a priority, a work crew, a distance traveled in the geographic work zone, moving time, idle time, a time of day, and a facilities management category, wherein the alert identifies an inefficiency or a work activity requiring attention.

12. The system of claim 1, further including a communication device attached to the facility vehicle configured for providing instructions to a user, wherein the communication device is a display or a radio.

13. A vehicle management system, comprising:
    a plurality of vehicles equipped with a tag device and a global positioning system (GPS) receiver;
    a vehicle management process embodied on a computer-readable tangible medium, comprising:
        an application service for receiving a location from the GPS receiver;
        at least one geographic work zone, wherein each geographic work zone represents a geographic area maintained within a golf course facility;

at least one geographic home zone, wherein each geographic home zone represents an area where golf course equipment is stored;

a graphic user interface for displaying the map representation, the at least one geographic work zone, the at least one geographic home zone, and the location of the tag device on each vehicle;

a tracking module that records a time period the tag device on each vehicle is within each geographic work zone, wherein one or more tag devices located on individual vehicles are grouped into individual work groups; and an efficiency module configured to compare the time period the tag device is within a geographic work zone to the pattern of movement within the geographic work zone.

14. The vehicle management system of claim 13, wherein the vehicle is further equipped with an inertial measurement unit (IMU) for detecting motion of the vehicle.

15. The vehicle management system of claim 13, wherein the vehicle management process further comprises a scheduling module configured for scheduling the vehicle at a future time in at least one geographic work zone.

16. The vehicle management system of claim 13, wherein the vehicle is further equipped with a communication device for providing instructions to a user, wherein the communication device is a display or a radio.

17. A method for managing facilities, comprising:
equipping a plurality of vehicles with a tag device having a transceiver;
designating a zone in a geographic work area in which each of the vehicles operate, wherein each geographic work zone represents a geographic area maintained within a golf course facility by the vehicle;
monitoring motion of the vehicles within each geographic work zone;
monitoring a location of the vehicles;
transmitting the location and motion via the tag device to a vehicle management process embodied on a server and comprising computer-executable instructions for comparing the location of the tag device to the zone;
recording a time period when the location of the tag device is within the zone;
aggregating different ones of the plurality of vehicles into individual work groups; and
determining the total amount of time spent by discrete work groups in each zone and comparing the amount of time spent by discrete work groups to a pattern of movement of each work group in each zone.

18. The method of claim 17, further comprising displaying the location of the tag device, the zone, and a map representation of the geographic work area and a geographic home area on a graphical user interface, wherein the geographic home zone represents an area where equipment is stored, maintained, or repaired.

19. The method of claim 17, further comprising reporting the time period of the tag device in the zone in at least one of a displayed report and a printed report.

* * * * *